United States Patent
Ishiyama et al.

(10) Patent No.: US 8,130,259 B2
(45) Date of Patent: Mar. 6, 2012

(54) THREE-DIMENSIONAL DISPLAY DEVICE AND METHOD AS WELL AS PROGRAM

(75) Inventors: Eiji Ishiyama, Miyagi (JP); Mikio Watanabe, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/060,428

(22) PCT Filed: Oct. 22, 2009

(86) PCT No.: PCT/JP2009/005551
§ 371 (c)(1),
(2), (4) Date: Feb. 23, 2011

(87) PCT Pub. No.: WO2010/050158
PCT Pub. Date: May 6, 2010

(65) Prior Publication Data
US 2011/0157328 A1    Jun. 30, 2011

(30) Foreign Application Priority Data
Oct. 27, 2008   (JP) ................................. 2008-275028

(51) Int. Cl.
H04N 13/04   (2006.01)
(52) U.S. Cl. ................ 348/51; 348/56; 348/59; 348/54; 348/55; 348/60
(58) Field of Classification Search .................... 348/51, 348/54, 55, 56, 59, 60
See application file for complete search history.

(56) References Cited

U.S. PATENT DOCUMENTS

| | | | | |
|---|---|---|---|---|
| 5,936,663 A | * | 8/1999 | Tabata et al. | 348/51 |
| 2006/0203085 A1 | * | 9/2006 | Tomita | 348/51 |

FOREIGN PATENT DOCUMENTS

| | | |
|---|---|---|
| JP | 8-65715 A | 3/1996 |
| JP | 8-205203 A | 8/1996 |
| JP | 2004-221700 A | 8/2004 |
| JP | 2005-33696 A | 2/2005 |
| JP | 2005-65162 A | 3/2005 |

* cited by examiner

Primary Examiner — Shawn An
(74) Attorney, Agent, or Firm — McGinn IP Law Group, PLLC

(57) ABSTRACT

When an end portion of a three-dimensional image appears to pop forward from a display surface, a predetermined end area is set at a periphery of images forming the three-dimensional image to modify at least one of the images to modify the stereoscopic effect so that at least a part of the end portion appears to be level with the display surface. A disparity between corresponding pixels in the end area of the images is modified so that the disparity is gradually decreased toward the end of the images, and image parts at left and right areas of the end area of a reference image among the images are deformed based on the disparity. At least one of the images is modified by modifying the image other than the reference image with the deformed image parts of the end area. Then, three-dimensional processing is applied to the modified images.

12 Claims, 14 Drawing Sheets

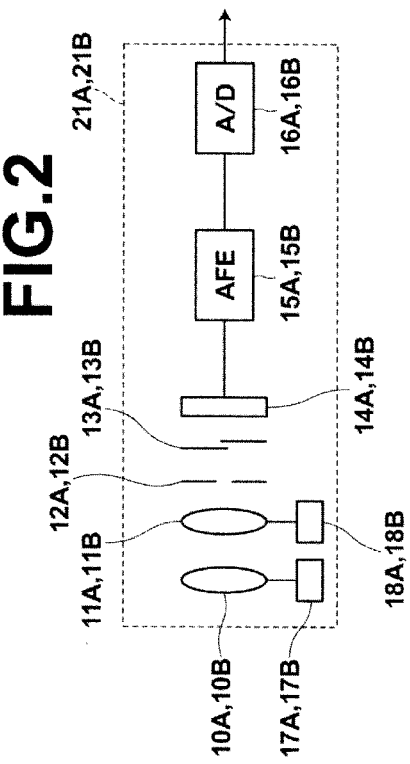
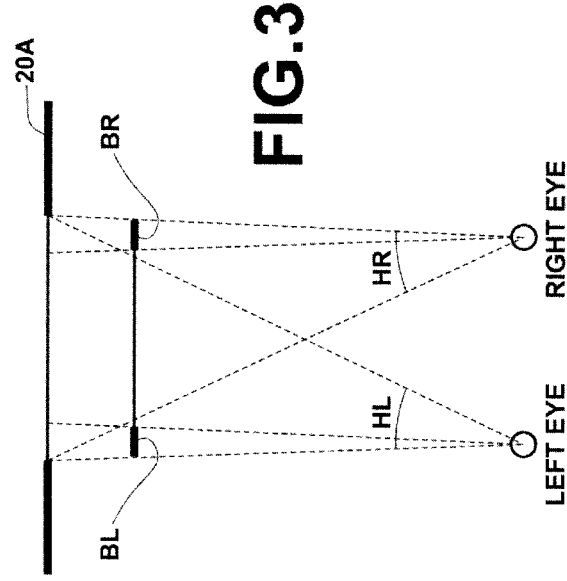

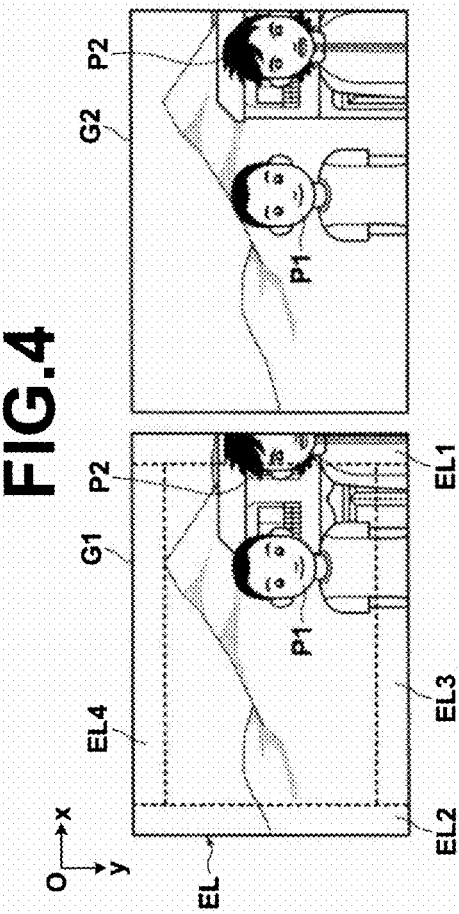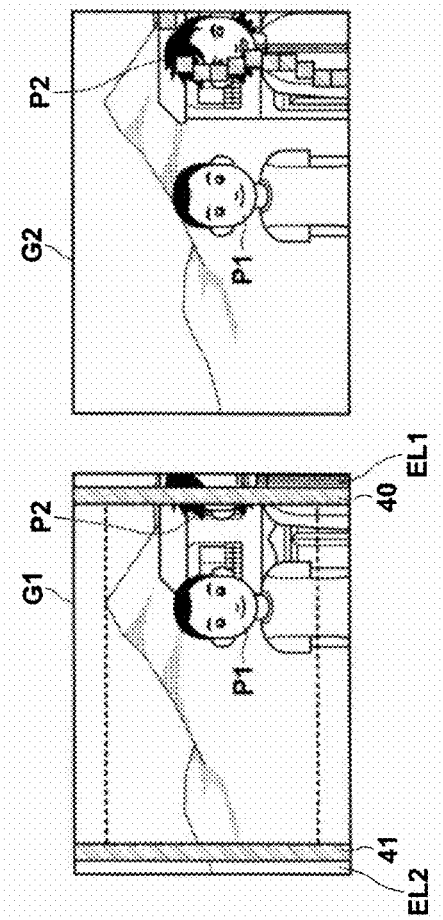

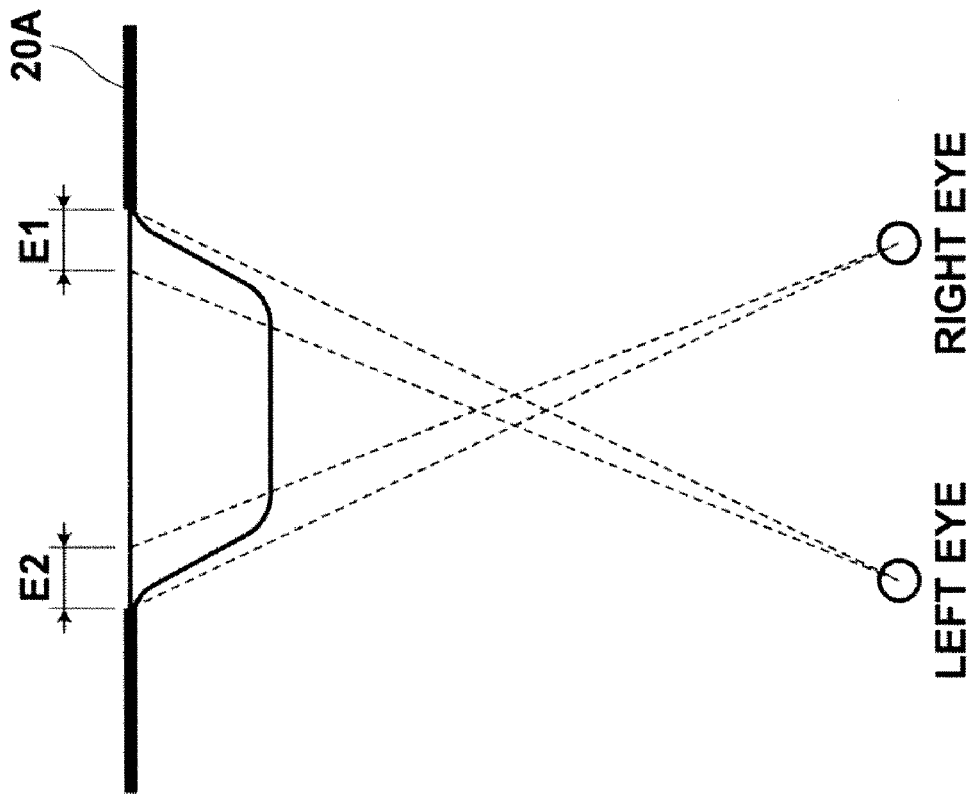

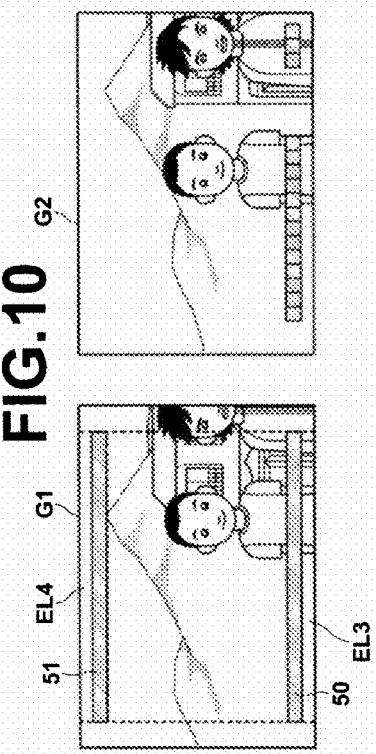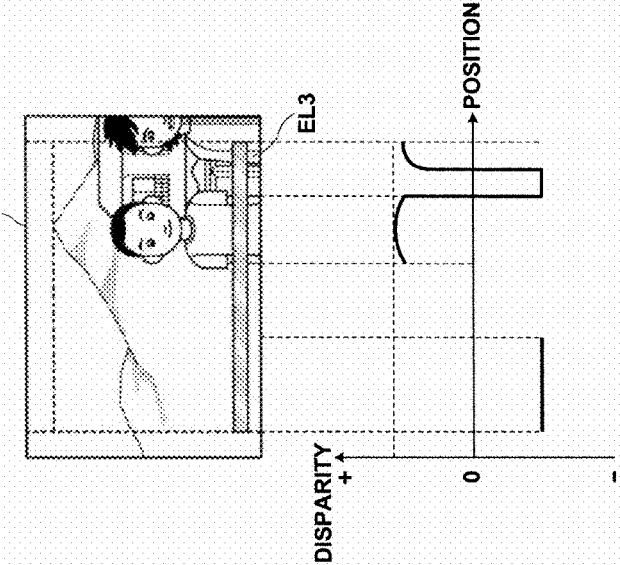

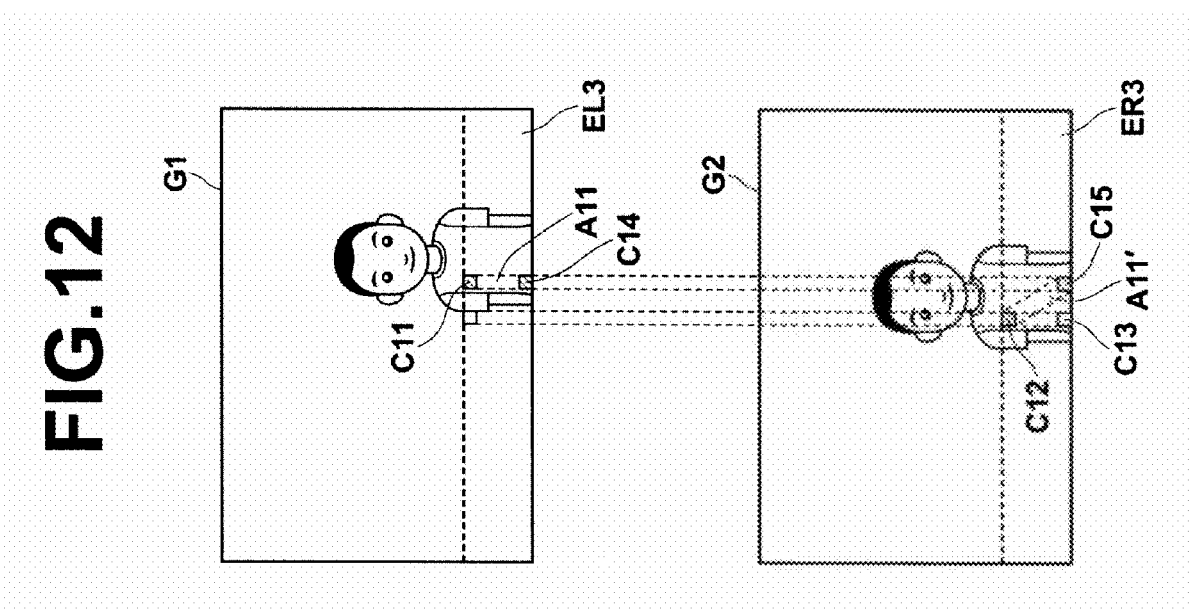

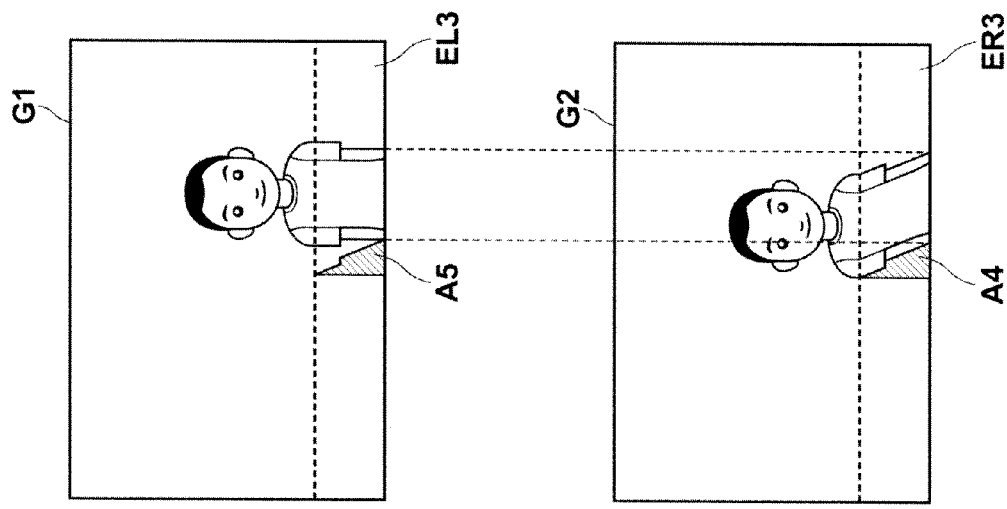

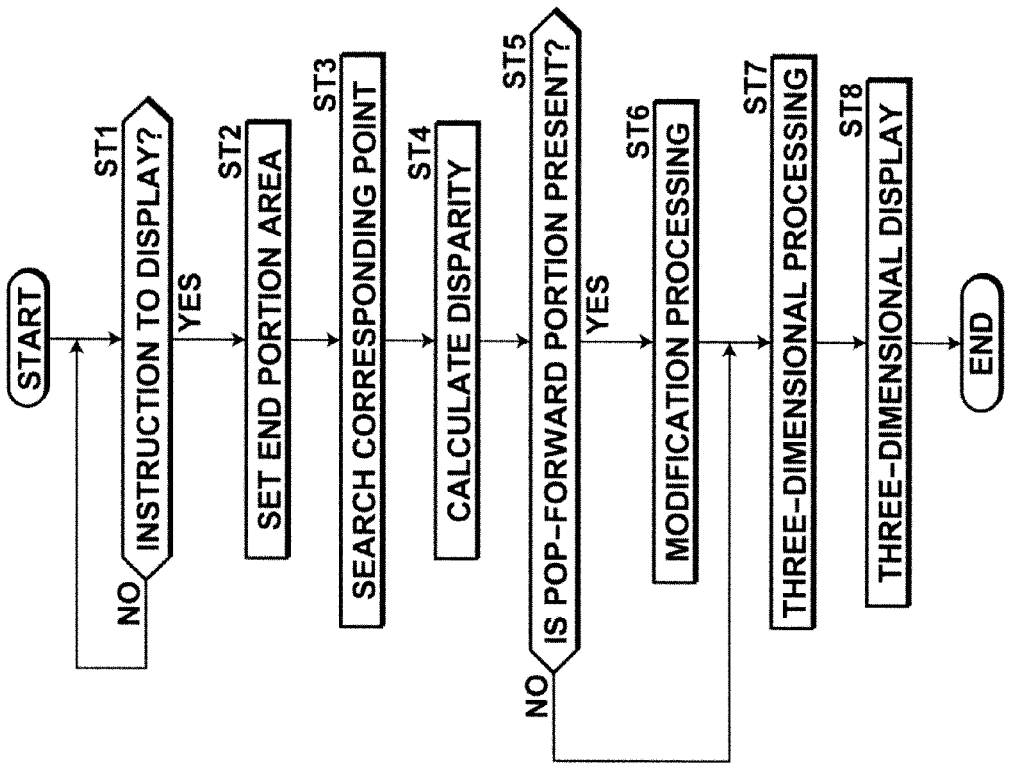

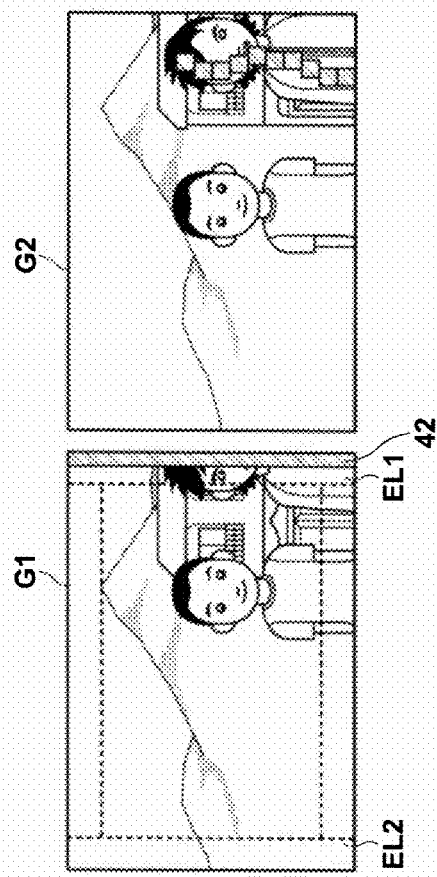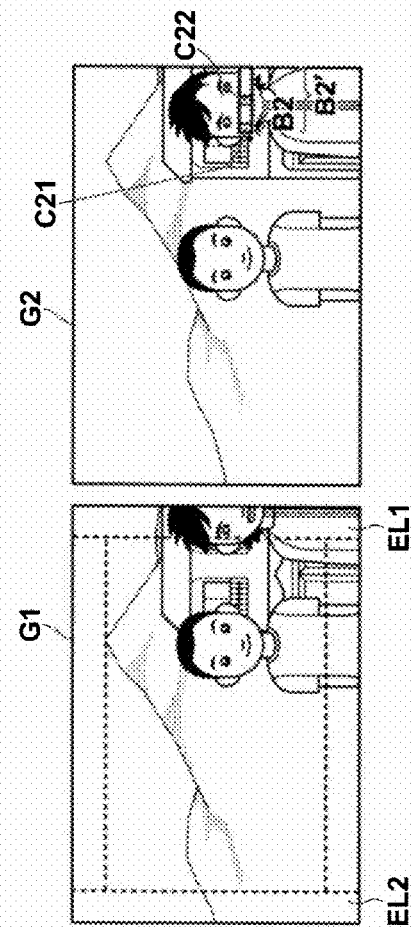

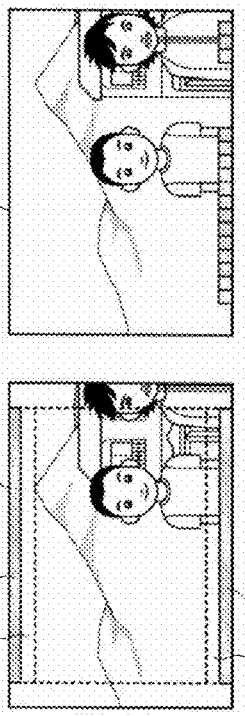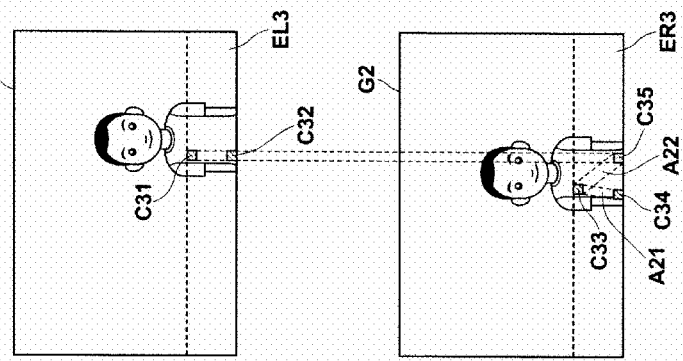

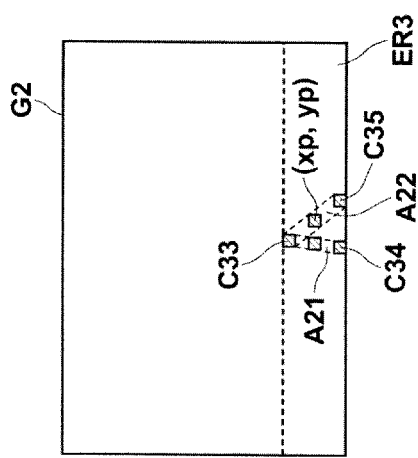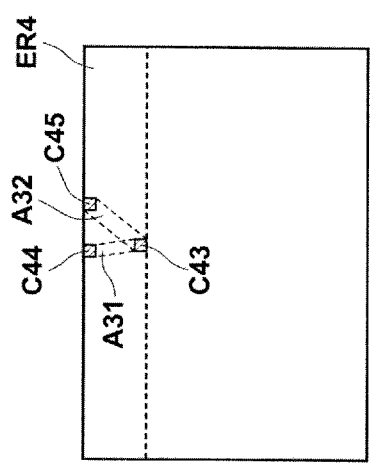

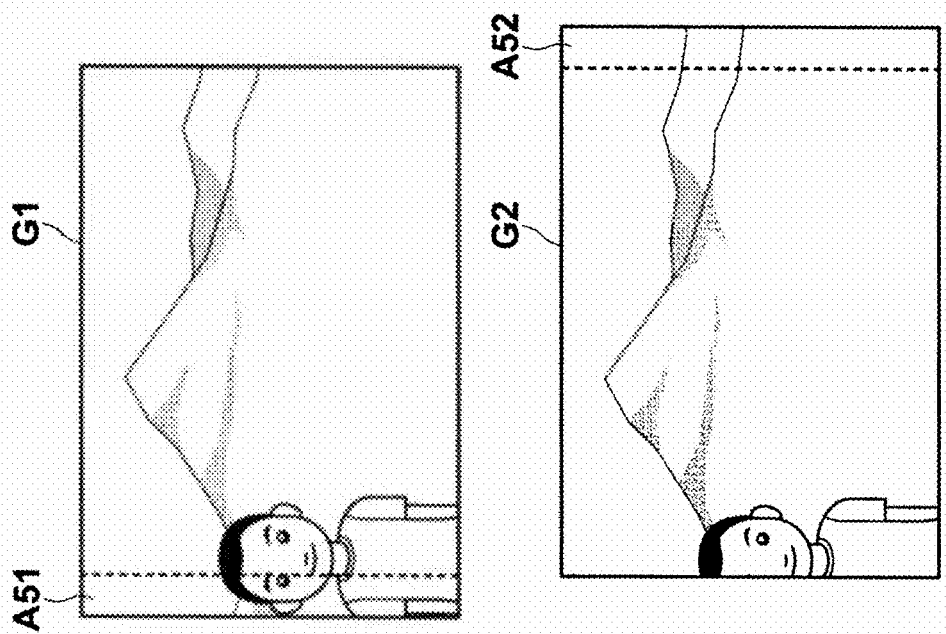

THREE-DIMENSIONAL DISPLAY DEVICE AND METHOD AS WELL AS PROGRAM

TECHNICAL FIELD

The present invention relates to three-dimensional display device and method for three-dimensionally displaying a plurality of images to allow stereoscopic viewing of the images, as well as a program for causing a computer to carry out the three-dimensional display method.

BACKGROUND ART

It has been known to three-dimensionally displaying a combination of images to provide stereoscopic viewing with utilizing a disparity between the images. Such stereoscopic viewing can be achieved by taking more than one images of the same subject with more than one cameras placed at different positions, and three-dimensionally displaying the images with utilizing a disparity between the subject images contained in the images.

Specifically, if the stereoscopic viewing is achieved by parallel viewing with naked eyes, the three-dimensional display can be achieved by arranging the images side by side. Further, the three-dimensional display may be achieved by combining images, for example, by overlapping the images with changing the colors of the images, such as into red and blue, or by overlapping the images with providing different polarization directions of the images. In these cases, the stereoscopic viewing can be achieved by using image separating glasses, such as red-and-blue glasses or polarization glasses, to provide a merged view of the images displayed for three-dimensional viewing attained via the automatic focusing function of the eyes (anaglyph system, polarization filter system).

Furthermore, the stereoscopic viewing may be achieved by displaying images on a three-dimensional display monitor which allow the stereoscopic viewing, such as of a parallax barrier system or a lenticular system, without using polarization glasses, etc. In this case, the three-dimensional display is achieved by alternately arranging vertical strips of the images. Moreover, a method for providing three-dimensional display by alternately displaying left and right images with changing directions of light beams from the left and right images through the use of image separation glasses or attaching an optical element on the liquid crystal display has bee proposed (scanning backlight system).

In addition, a polynocular camera including more than one imaging units for taking images for the above-described three-dimensional display has been proposed. Such a polynocular camera includes a three-dimensional display monitor, and generates a three-dimensional image for three-dimensional display from the images acquired with the imaging units. The generated three-dimensional image can be displayed for three-dimensional viewing on the three-dimensional display monitor.

The images used for the three-dimensional display are obtained by photographing a subject from different points of view, and therefore each image contains an area at the end portion thereof which is not contained in the other image. For example, in a case where the three-dimensional display is carried out using two images G1 and G2 as shown in FIG. 22, an area A51 in the image G1 is not present in the image G2, and an area A52 in the image G2 is not present in the image G1. When such images are displayed for three-dimensional viewing, even if the person at the end portion of each image is to appear to pop forward from the display surface, the stereoscopic effect of the person abruptly vanishes at the left end portion of the three-dimensional image and the left half of the person is displayed two-dimensionally, since a part of the person is not present in the image G2. This results in very unnatural appearance at the end portion of the three-dimensional image.

In order to address this problem, a method has been proposed, in which, when one of the images contains complete information of an object, which appears to pop forward when stereoscopically viewed, and the other of the images does not contain complete information of the object, and thus the three-dimensional display cannot be achieved, the one of the images is masked, for example, to remove a part of the information of the object, thereby achieving the three-dimensional display (see Japanese Unexamined Patent Publication No. 8 (1996)-065715, which is hereinafter referred to as patent document 1). Another method has been proposed, which changes the stereoscopic effect of objects when images containing more than one objects are displayed for three-dimensional viewing (see Japanese Unexamined Patent Publication No. 2005-065162, which is hereinafter referred to as patent document 2).

In the method disclosed in patent document 1, however, although the situation where the object cannot be displayed for three-dimensional viewing is resolved, this method is effective only on a particular object, and the stereoscopic effect of other objects, which are present in front of or at the rear of the particular object, abruptly vanishes. Thus, if the three-dimensional image has a stereoscopic effect with which the image appears to pop forward from the display surface, the observer who views the image feels that the three-dimensional image is very unnatural.

DISCLOSURE OF INVENTION

In view of the above-described circumstances, the present invention is directed to providing natural appearance at end portions of a three-dimensional image when the image is displayed for three-dimensional viewing.

A three-dimensional display device according to the invention includes: three-dimensional processing means for applying three-dimensional processing for three-dimensional display to a plurality of images having a disparity therebetween to generate a three-dimensional image; display means for carrying out at least three-dimensional display of the three-dimensional image; and modifying means for modifying, in a case where an end portion of the three-dimensional image appears to pop forward from a display surface of the display means when the three-dimensional display is carried out, at least one of the images to modify a stereoscopic effect at least a part of the end portion so that at least the part of the end portion appears to be level with the display surface, wherein the three-dimensional processing means applies the three-dimensional processing to the modified images.

"The modified images" herein refers to all the modified images when all the images are modified, or refers to the images including the modified image and the unmodified image other than the modified image when only one or some of the images is modified.

In the three-dimensional display device according to the invention, the modifying means may modify at least one of the images to modify a disparity at an area in the vicinity of an end of the images so that the disparity is gradually decreased toward the end of the images.

In the three-dimensional display device according to the invention, the modifying means may set an end portion area of a predetermined range at least a part of a periphery of the images, and may modify a disparity between corresponding pixels in the end portion area of the images so that the disparity is gradually decreased toward the end of the images.

To "set an end portion area of a predetermined range at least a part of a periphery of the images" herein refers to set the end portion area at least one of upper, lower, left and right portions of the images. It is preferred to set the end portion area at the entire periphery of the image, i.e., all of the upper, lower, left and right portions. However, the end portion area may be set only at the left and right portions, or only at the upper and lower portions.

In the three-dimensional display device according to the invention, the modifying means may modify at least one of the images by deforming an image part of the end portion area of a reference image serving as a reference among the images based on the disparity, and modifying an image part other than the end portion area with the deformed image part of the end portion area.

In this case, the modifying means may search, in the image other than the reference image, a point corresponding to a reference pixel at the farthest position from the end of the reference image within the end portion area of the reference image serving as a reference among the images, deform a pixel area formed by pixels lined between the reference pixel and the end of the reference image based on a disparity between the reference pixel and the corresponding point corresponding to the reference pixel, and modify the other image with the deformed pixel area with using the corresponding point in the other image as a reference.

In the three-dimensional display device according to the invention, the modifying means may modify at least one of the images by deforming an image part of the end portion area of at least one of the images based on the disparity.

In this case, the modifying means may search, in the image other than the reference image, a first corresponding point which is a point corresponding to a reference pixel at the farthest position from the end of the reference image and a second corresponding point which is a point corresponding to an end pixel at the end of the reference image within the end portion area of the reference image serving as a reference among the images, and deform a pixel area formed by pixels lined between the first corresponding point and the second corresponding point in the other image based on a disparity between the reference pixel and the first corresponding point and a disparity between the end pixel and the second corresponding point.

A three-dimensional display method according to the invention is for use with a three-dimensional display device including three-dimensional processing means for applying three-dimensional processing for three-dimensional display to a plurality of images having a disparity therebetween to generate a three-dimensional image, and display means for carrying out at least three-dimensional display of the three-dimensional image, the method including: modifying, in a case where an end portion of the three-dimensional image appears to pop forward from a display surface of the display means when the three-dimensional display is carried out, at least one of the images to modify a stereoscopic effect at least a part of the end portion so that at least the part of the end portion appears to be level with the display surface; and applying the three-dimensional processing to the modified images.

The invention may be provided in the form of a program for causing a computer to carry out the three-dimensional display method of the invention.

A three-dimensional processing device according to the invention includes: three dimensional processing means for applying three-dimensional processing for three-dimensional display to a plurality of images having a disparity therebetween to generate a three-dimensional image; and modifying means for modifying, in a case where an end portion of the three-dimensional image appears to pop forward from a display surface of a display means when the three-dimensional display is carried out, at least one of the images to modify a stereoscopic effect at least a part of the end portion so that at least the part of the end portion appears to be level with the display surface, wherein the three-dimensional processing means applies the three-dimensional processing to the modified images.

A three-dimensional processing method according to the invention is a three-dimensional processing method of applying three-dimensional processing for three-dimensional display to a plurality of images having a disparity therebetween to generate a three-dimensional image, the method including: modifying, in a case where an end portion of the three-dimensional image appears to pop forward from a display surface of a display means when the three-dimensional display is carried out, at least one of the images to modify a stereoscopic effect at least a part of the end portion so that at least the part of the end portion appears to be level with the display surface; and applying the three-dimensional processing to the modified images.

The invention may be provided in the form of a program for causing a computer to carry out the three-dimensional processing method of the invention.

According to the invention, in a case where an end portion of the three-dimensional image appears to pop forward from a display surface of the display means when the three-dimensional display is carried out, at least one of the plurality of images is modified to modify a stereoscopic effect at least a part of the end portion so that at least the part of the end portion appears to be level with the display surface, and the three-dimensional processing is applied to the modified images. Thus, when the end portion of the three-dimensional image has a stereoscopic effect to appear to pop forward from the display surface, the stereoscopic effect of the images is gradually decreased toward the end of the image. Therefore, even when each of the plurality of images contains an area at the periphery thereof which is not visible in the other of the images, the stereoscopic effect in the area does not abruptly vanish, thereby providing natural appearance at the end portion of the three-dimensional image.

BRIEF DESCRIPTION OF DRAWINGS

FIG. 2 is a diagram illustrating the configuration of imaging units, FIG. 3 is a diagram illustrating a stereoscopic effect when first and second images are displayed for three-dimensional viewing, FIG. 4 is a diagram illustrating a state where an end portion area is set in a first image, FIG. 5 is a diagram for explaining search of corresponding points in a right area in the first embodiment, FIG. 9 is a diagram for explaining a result of modification processing in the first embodiment, FIG. 10 is a diagram for explaining search of corresponding points in a lower area in the first embodiment, FIG. 11 is a diagram illustrating a disparity between the corresponding points together with a first image, FIG. 12 is a diagram for explaining overwrite processing for the lower area in the first embodiment, FIG. 13 is another diagram for explaining the overwrite processing for the lower area in the first embodiment, FIG. 15 is a flow chart illustrating a process carried out in the first embodiment, FIG. 16 is a diagram for explaining search of the corresponding points in a right area in a second embodiment, FIG. 17 is a diagram for explaining overwrite processing for the right area in the second embodiment, FIG. 18 is a diagram for explaining search of the corresponding points in a lower area in the second embodiment, FIG. 19 is a diagram for explaining overwrite processing for the lower area in the second embodiment, FIG. 20 is a diagram for explaining a correspondence relationship between pixels in a deformed area and pixels in an area before being deformed in the second embodiment, FIG. 21 is another diagram for explaining a correspondence relationship between pixels in a deformed area and pixels in an area before being deformed in the second embodiment, and FIG. 22 is a diagram illustrating a plurality of images for three-dimensional display.

BEST MODE FOR CARRYING OUT THE INVENTION

Figure 1:
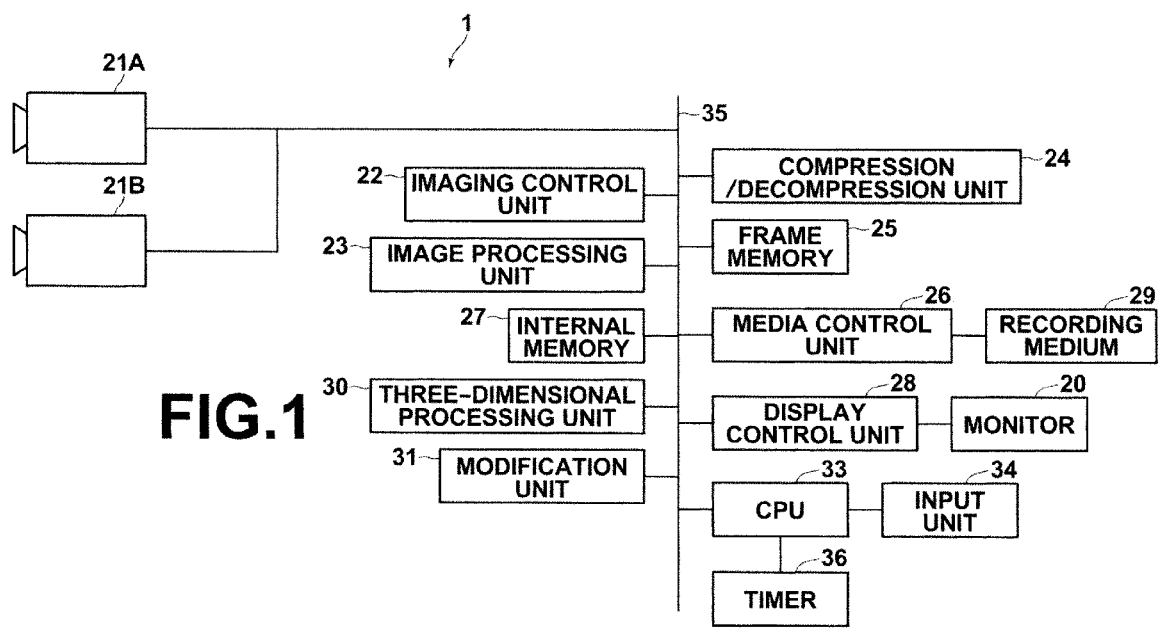
FIG. 1 is a schematic block diagram illustrating the internal configuration of a polynocular camera, to which a three-dimensional display device according to a first embodiment of the present invention is applied.

Hereinafter, embodiments of the present invention will be described with reference to the drawings. FIG. 1 is a schematic block diagram illustrating the internal configuration of a polynocular camera, to which a three-dimensional display device according to a first embodiment of the invention is applied. As shown in FIG. 1, the polynocular camera 1 according to the first embodiment includes two imaging units 21A and 21B, an imaging control unit 22, an image processing unit 23, a compression/decompression unit 24, a frame memory 25, a media control unit 26, an internal memory 27, and a display control unit 28. The imaging units 21A and 21B are placed to be able to photograph a subject with a predetermined baseline length and a convergence angle. It is assumed here that positions of the imaging units 21A and 21B in the vertical direction are the same.

FIG. 2 illustrates the configuration of the imaging units 21A and 21B. As shown in FIG. 2, the imaging units 21A and 21B include focusing lenses 10A and 10B, zooming lenses 11A and 11B, aperture diaphragms 12A and 12B, shutters 13A and 13B, CCDs 14A and 14B, analog front ends (AFE) 15A and 15B and A/D converting units 16A and 16B, respectively. The imaging units 21A and 21B further include focusing lens driving units 17A and 17B for driving the focusing lenses 10A and 10B and zooming lens driving units 18A and 18B for driving the zooming lenses 11A and 11B.

The focusing lenses 10A and 10B are used to focus on the subject, and are movable along the optical axis directions by focusing lens driving units 17A and 173, each of which is formed by a motor and a motor driver. The focusing lens driving units 17A and 17B control the movement of the focusing lenses 10A and 10B based on focused focal position data which is obtained through AF processing, which will be described later, carried out by the imaging control unit 22.

The zooming lenses 11A and 11B are used to achieve a zooming function, and are movable along the optical axis directions by zooming lens driving units 18A and 18B, each of which is formed by a motor and a motor driver. The zooming lens driving units 18A and 18B control the movement of the zooming Tenses 11A and 11B based on zoom data obtained at the CPU 33 upon operation of a zoom lever, which is included in an input unit 34.

Aperture diameters of the aperture diaphragms 12A and 12B are adjusted by an aperture diaphragm driving unit (not shown) based on aperture value data obtained through AE processing carried out by the imaging control unit 22.

The shutters 13A and 13B are mechanical shutters, and are driven by a shutter driving unit (not shown) according to a shutter speed obtained through the AE processing.

Each of the CCDs 14A and 14B includes a photoelectric surface, on which a large number of light-receiving elements are arranged two-dimensionally. A light image of the subject is focused on each photoelectric surface and is subjected to photoelectric conversion to obtain an analog imaging signal. Further, a color filter formed by regularly arrayed R, G and B color filters are disposed on the front side of each CCD 14A, 14B.

The AFEs 15A and 15B process the analog imaging signals fed from the CCDs 14A and 14B to remove noise from the analog imaging signals and adjust gain of the analog imaging signals (this operation is hereinafter referred to as "analog processing").

The A/D converting units 16A and 16B convert the analog imaging signals, which have been subjected to the analog processing by the AFEs 15A and 15B, into digital imaging signals. The images represented by digital image data acquired by the imaging units 21A and 21B are referred to as a first image G1 and a second image G2, respectively.

The imaging control unit 22 includes an AF processing unit and an AE processing unit (not shown). When a release button included in the input unit 34 is half-pressed, the imaging units 21A and 21B acquire preliminary images. Then, the AF processing unit determines focused areas and focal distances for the lenses 10A and 10B based on the preliminary images, and outputs the information to the imaging units 21A and 21B. The AE processing unit determines an aperture value and shutter speed based on a brightness evaluation value, which is calculated from brightness values of the preliminary images, and outputs the information to the imaging units 21A and 21B.

As the method used to detect the focal points through the AF processing, a passive method may be used, for example. In the passive method, the focused focal point is detected by utilizing the fact that an image containing a desired subject being focused has a higher contrast value. More specifically, each preliminary image is divided into a plurality of AF areas, and an image in each AF area is filtered using a high-pass filter. Then, an AF evaluation value, which is an evaluation value for high-frequency component, is calculated for each AF area, and the AF area having the highest evaluation value, i.e., the highest output value from the filter, is detected as the focused area.

When the release button is fully pressed, the imaging control unit 22 instructs the imaging units 21A and 21B to carry out actual imaging to acquire actual images of the first and second images G1 and G2. It should be noted that, before the release button is operated, the imaging control unit 22 instructs the imaging units 21A and 21B to successively acquire live view images, which have fewer pixels than the actual images, at a predetermined time interval (for example, at an interval of 1/30 seconds) for checking imaging ranges of the imaging units 21A and 21B.

The image processing unit 23 applies image processing, such as white balance adjustment, tone correction, sharpness correction and color correction, to the digital image data of the first and second images G1 and G2 acquired by the imaging units 21A and 21B. In this description, the first and second images which have been processed by the image processing unit 23 are also denoted by the same reference symbols G1 and G2 used for the unprocessed first and second images.

The compression/decompression processing unit 24 applies compression processing according to a certain compression format, such as JPEG, to the image data representing a three-dimensional image for three-dimensional display, which is generated, as will be described later, from the actual images of the first and second images G1 and G2 processed by the image processing unit 23, and generates a three-dimensional image file for three-dimensional display. The three-dimensional image file contains the image data of the first and second images G1 and G2 and the image data of the three-dimensional image. A tag storing associated information, such as photographing time and date, is added to the image file, based, for example, on the Exif format.

The frame memory 25 provides a workspace for various processing, including the processing by the image processing unit 23, applied to the image data representing the first and second images G1 and G2 acquired by the imaging units 21A and 21B.

The media control unit 26 accesses a recording medium 29 and controls writing and reading of the three-dimensional image file, etc., into and from the recording medium 29.

The internal memory 27 stores the baseline length and the convergence angle of the imaging units 21A and 21B, various constants to be set within the polynocular camera 1, a program executed by the CPU 33, etc. The internal memory 27 also stores information of a range of an end portion area, which is set during modification processing carried out by a modification unit 31, as will be described later.

The display control unit 28 causes the first and second images G1 and G2 stored in the frame memory 25 during imaging to be displayed for two-dimensional viewing on the monitor 20, or causes the first and second images G1 and G2 recorded in the recording media 29 to be displayed for two-dimensional viewing on the monitor 20. Further, the display control unit 28 can cause the first and second images G1 and G2, which have been subjected to three-dimensional processing, as will be described later, to be displayed for three-dimensional viewing on the monitor 20, or can cause the three-dimensional image recorded in the recording media 29 to be displayed for three-dimensional viewing on the monitor 20. Switching between the two-dimensional display and the three-dimensional display may automatically be carried out, or may be carried out according to instructions from the photographer via the input unit 34. During the three-dimensional display, live view images of the first and second images G1 and G2 are displayed for three-dimensional viewing on the monitor 20 until the release button is pressed.

It should be noted that, when the display mode is switched to the three-dimensional display, both the first and second images G1 and G2 are used for the display, as will be described later. In contrast, when the display mode is switched to the two-dimensional display, one of the first and second images G1 and G2 is used for the display. In this embodiment, the first image G1 is used for the two-dimensional display.

The polynocular camera 1 according to this embodiment further includes a three-dimensional processing unit 30. The three-dimensional processing unit 30 applies the three-dimensional processing to the first and second images G1 and G2 for the three-dimensional display of the first and second images G1 and G2 on the monitor 20. The three-dimensional display technique used in this embodiment may be any of known techniques. For example, the first and second images G1 and G2 may be displayed side by side to achieve stereoscopic viewing by parallel viewing with naked eyes, or a lenticular system may be used to achieve the three-dimensional display, in which a lenticular lens is attached on the monitor 20, and the images G1 and G2 are displayed at predetermined positions on the display surface of the monitor 20 so that the first and second images G1 and G2 are respectively viewed by the left and right eyes. Further, a scanning backlight system may be used, which achieves the three-dimensional display by optically separating the optical paths of the backlight of the monitor 20 correspondingly to the left and right eyes in an alternate manner, and alternately displaying the first and second images G1 and G2 on the display surface of the monitor 20 according to the separation of the backlight to the left or the right.

The monitor 20 is modified according to the type of the three-dimensional processing carried out by the three-dimensional processing unit 30. For example, if the three-dimensional display is implemented with a lenticular system, a lenticular lens is attached on the display surface of the monitor 20. If the three-dimensional display is implemented with a scanning backlight system, an optical element for changing directions of the light beams from the left and right images is attached on the display surface of the monitor 20.

FIG. 3 illustrates the stereoscopic effect that is obtained when the first and second images G1 and G2 are displayed for three-dimensional viewing. In this embodiment, the three-dimensional display is achieved with the scanning backlight system by alternately displaying the first and second images G1 and G2. Further, the three-dimensional image has a stereoscopic effect, with which the entire image appears to pop forward from the display surface 20A of the monitor 20. As shown in FIG. 3, when the first and second images G1 and G2 are displayed for three-dimensional viewing, the three-dimensional image can be stereoscopically viewed such that the image appears to pop forward from display surface 20A of the monitor 20. However, since the first and second images G1 and G2 have been acquired by photographing the subject from different points of view, the first and second images G1 and G2 contain, at their end portions, areas A51 and A52, each of which is not contained in the other image, as shown in FIG. 22. Thus, on the three-dimensional image, a range HL visible by the left eye and a range HR visible by the right eye are different, and this results in a portion BL which is visible only by the left eye and a portion BR which is visible only by the right eye appearing on the three-dimensional image.

When the portion BL which is visible only by the left eye and the portion BR which is visible only by the right eye appear on the three-dimensional image in this manner, the stereoscopic effect at areas, which can be viewed with the stereoscopic effect to pop forward stereoscopic viewing, adjacent to the portions BL and BR abruptly vanishes at the boundary, and thus the three-dimensional image appears very unnatural.

In this embodiment, therefore, the modification unit 31 is provided for modifying at least one of the first and second images G1 and G2, and the three-dimensional processing unit 30 applies the three-dimensional processing to the first and second images G1 and G2 modified by the modification unit 31. In this embodiment, the modification unit 31 modifies only the second image G2. Now, operations carried out by the modification unit 31 are described.

First, the modification unit 31 set the first image G1, among the first and second images G1 and G2, as a reference image, and then sets an end portion area of a predetermined range at the periphery of the first image G1. FIG. 4 illustrates a state where the end portion area is set at the periphery of the first image G1. It is assumed here that the first and second images G1 and G2 each contains two persons P1 and P2 with mountains on the background, and a building between the mountains and the persons P1 and P2, as shown in FIG. 4. As shown in FIG. 4, the modification unit 31 sets an end portion area EL at the periphery of the first image G1. It is assumed here that the end portion area EL is divided into four areas: a right area EL1, a left area EL2, an upper area EL3 and a lower area EL4. Further, the width in the horizontal direction of the right area EL1 and the left area EL2 is "a" and the width in the vertical direction of the lower area EL3 and the upper area EL4 is "b". The information of the widths a and b of the end portion area is stored in the internal memory 27.

Then, the modification unit 31 searches for points in the second image G2 corresponding to pixels in the end portion area EL of the first image G1. Since the positions of the imaging units 21A and 21B in the vertical direction are at the same, the modification unit 31 sets, for each pixel in the end portion area EL, a block having a predetermined size with the pixel positioned at the center of the block, and carries out block matching to calculate a correlation value with shifting the block only in the x-direction. Then, a pixel on the second image G2 having a correlation value indicating the largest correlation is searched out as the point corresponding to the pixel of interest.

Subsequently, the modification unit 31 calculates a disparity between the searched-out corresponding points, and determines, for each of the four areas of the end portion area EL, i.e., the right area EL1, the left area EL2, the upper area EL3 and the lower area EL4, whether or not the area contains a portion which is to appear to pop forward from the display surface of the monitor 20 in the stereoscopic view when the first and second images G1 and G2 are displayed for three-dimensional viewing, based on the calculated disparity. Then, the modification unit 31 applies the modification processing to the area for which affirmative determination has been made.

Now, the modification processing which is carried out when it is determined that the right area EL1 contains a portion which is to appear to pop forward from the display surface of the monitor 20 in the stereoscopic view is described. First, the modification unit 31 searches for a point in the second image G2 corresponding to each pixel in the right area EL1 of the first image G1. FIG. 5 is a diagram for explaining the search of the corresponding points in the first embodiment. As shown in FIG. 5, the modification unit 31 sets a pixel line 40 (indicated by the diagonal hatching) of pixels lined in the y-direction at the left end of the right area EL1 of the first image G1, and searches for a corresponding point in the second image G2 for each pixel in the pixel line 40. It should be noted that, since the corresponding points have been searched out for the above-described determination, the corresponding points searched out for the above determination may be used in this operation.

In this manner, the corresponding points in the second image G2 corresponding to the pixels in the pixel line 40 are searched out, as shown FIG. 5. The pixels in the pixel line 40 in the first image G1 are points corresponding to the searched out corresponding points in the second image G2. Therefore, in the following description, each pixel in a pixel line in the first image G1 may be referred to as a corresponding point. It should be noted that, in FIG. 5 and in the following description, the corresponding points and each pixel in the pixel line are shown larger than the actual pixel, for the convenience of explanation.

Figure 6:
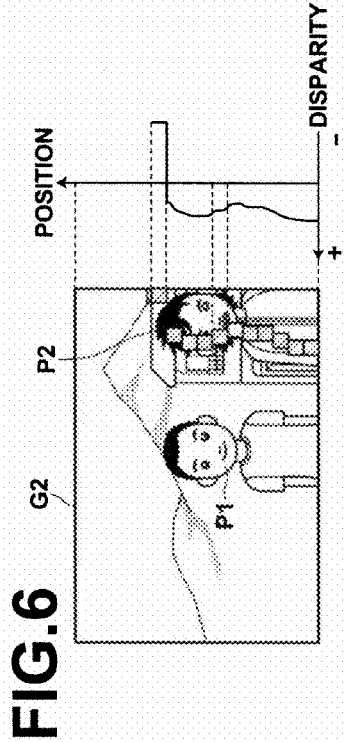
FIG. 6 is a diagram illustrating a disparity between corresponding points together with a second image.

In this embodiment, a coordinate system is set in the first and second images G1 and G2 with a common position (the upper-left corner of the image) being an origin, the horizontal direction being the x-direction and the vertical direction being the y-direction. With such a coordinate system being set, a difference of position in the x-direction between the corresponding points on the first and second images G1 and G2 is a disparity between the corresponding points. The larger the disparity, the larger the stereoscopic effect. FIG. 6 illustrates the disparity between the corresponding points together with the second image G2. As shown in FIG. 6, the disparity between the corresponding points corresponding to the person P2 is large, and the disparity corresponding to the building has a negative value. Further, the portion of the mountain in the pixel line 40 is out of the angle of view in the second image G2, i.e., is not contained in the second image G2, and thus the corresponding points have not been searched out.

Figure 7:
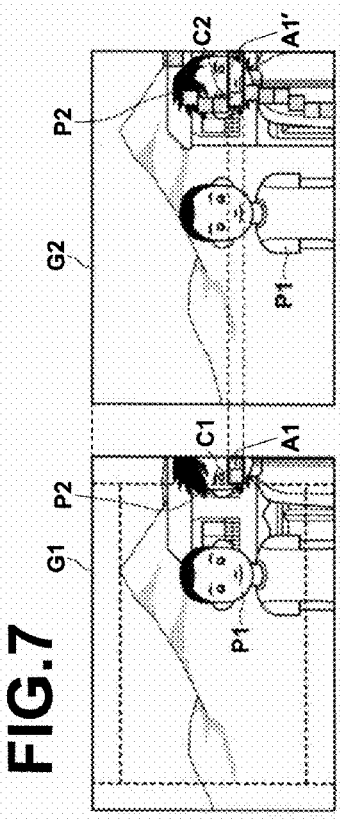
FIG. 7 is a diagram for explaining overwrite processing for the right area in the first embodiment.

Then, the modification unit 31 expands a linear area formed by a pixel line on the right of the pixel in the pixel line 40 in the first image G1, for which the corresponding point has been searched out, in the x-direction according to the disparity between the corresponding points, and carries out overwrite processing to overwrite the expanded area on the second image G2. FIG. 7 is a diagram for explaining the overwrite processing in the first embodiment. It should be noted that, in FIG. 7, only one pixel C1 is indicated by the diagonal hatching as a pixel of interest in the overwrite processing, for the convenience of explanation. The modification unit 31 sets a linear area A1 formed by a pixel line on the right of the pixel of interest C1. Assuming that the disparity between the pixel of interest C1 and a corresponding point C2 corresponding to the pixel of interest C1 is d1, and the width of the area A1 is a, the modification unit 31 expands the area A1 by a factor of $(a+d1)/a$ in the horizontal direction to generate an expanded area A1'.

Figure 8:
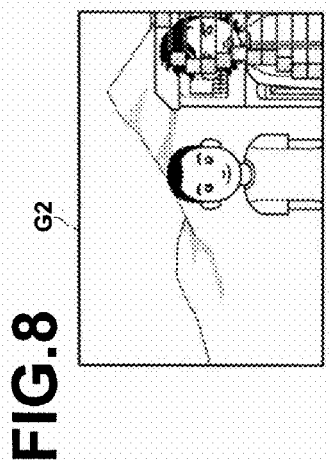
FIG. 8 is another diagram for explaining the overwrite processing for the right area in the first embodiment.

Then, the modification unit 31 overwrites the expanded area A1' on the second image G2 with positioning the left end of the expanded area at the corresponding point C2 in the second image G2. It should be noted that, since the expanded area A1' is generated by expanding the area A1 in the horizontal direction by the factor of $(a+d1)/a$, when the expanded area A1' is overwritten on the second image G2, the pixel at the right end of the expanded area A1' is positioned on the pixel at the right end of the second image G2. By carrying out this overwrite processing for all the searched out corresponding points in the second image G2, as shown in FIG. 8, the areas formed by the pixel lines on the right of the corresponding points in the second image G2 are overwritten with the expanded areas A1'.

On the other hand, if it is determined that the left area EL2 contains a portion which is to appear to pop forward from the display surface of the monitor 20 in the stereoscopic view, the modification unit 31 sets a pixel line 41 of pixels lined in the y-direction at the right end of the left area EL2 in the first image G1, as shown in FIG. 5, and searches for a corresponding point in the second image G2 corresponding to each pixel in the pixel line 41. Then, the modification unit 31 contracts an area formed by a pixel line on the left of each pixel in the pixel line 41 according to the disparity between the corresponding points, and overwrites the expanded area on the left of the corresponding point in the second image G2, thereby achieving the modification processing.

By applying the modification processing in this manner, the disparity between the area on the right of the corresponding points in the second image G2 corresponding to the pixel line 40 and the right area EL1 in the first image G1 is gradually decreased toward the right end, such that the disparity is 0 at the right end. Further, the disparity between the area on the left of the corresponding points in the second image G2 corresponding to the pixel line 41 and the left area EL2 in the first image G1 is gradually decreased toward the left end, such that the disparity is 0 at the left end. Therefore, when the first and second images G1 and G2 are displayed for three-dimensional viewing, as shown in FIG. 9, there is no such portion that is visible only by the left eye or the right eye, and the stereoscopic effect is gradually decreased toward the left and right ends. It should be noted that, in FIG. 9, an area E1 in the three-dimensional image corresponds to the right area EL1 of the end portion area EL, and an area E2 in the three-dimensional image corresponds to the left area EL2 of the end portion area EL.

Next, the modification processing that is carried out when it is determined that the lower area EL3 contains a portion which is to appear to pop forward from the display surface of the monitor 20 in the stereoscopic view is described. FIG. 10 is a diagram for explaining search of corresponding points at the lower area of the end portion area in the first embodiment. As shown in FIG. 10, the modification unit 31 sets a pixel line 50 (indicated by the diagonal hatching) of pixels lined in the x-direction at the upper end of the lower end area EL3 in the first image G1, and searches for a point in the second image G2 corresponding to each pixel in the pixel line 50. It should be noted that the search of the corresponding points is carried out in the same manner as described above. Thus, the corresponding points in the second image G2 corresponding to the pixels in the pixel line 50 are searched out, as shown in FIG. 10.

FIG. 11 illustrates the disparity between the corresponding points together with the first image G1. As shown in FIG. 11, the disparity is large between the corresponding points corresponding to the persons P1 and P2. Further, a portion in the first image G1 corresponding to an area on the left of the person P1 is hid by the person P1 in the second image G2, and therefore the corresponding points have not been searched out for the area on the left of the person P1 in the first image G1. Thus, the disparity is not calculated.

Here, assuming that a disparity between the corresponding points for each pixel in the pixel line 50 is dL(xL), a disparity between a corresponding point searched out in the second image G2 and the corresponding pixel in the pixel line 50 is dR(xR), coordinates of each pixel in the lower area EL3 of the end portion area EL in the first image G1 are (xL,yL), and coordinates of each pixel in a lower area ER3 in the second image G2 corresponding to the lower area EL3 are (xR,yR), then, since the coordinate system is set in the first and second images G1 and G2 with the upper-left corner of the image being the origin, coordinates of a corresponding point in the second image G2 corresponding to the pixel (xL,yL) in the first image G1 can be found by the equation:

$$(xR,yR)=(xL-dL(xL),yL)$$

Further, coordinates of a corresponding point in the first image G1 corresponding to the pixel (xR,yR) in the second image G2 can be found by the equation:

$$(xL,yL)=(xR+dR(xR),yR)$$

The modification unit 31 overwrites a pixel value of the pixel (xR,yR) in the lower area ER3 in the second image G2 with a pixel value of the pixel in the first image G1, which is calculated according to formula (1) shown below:

$$(xR-dR(xR)\times(yR-h)/b,yR) \qquad (1),$$

where h represents the number of pixels in the height direction of the first and second images G1 and G2, and b represents the width of the lower area EL3 in the vertical direction.

FIG. 12 is a diagram for explaining the overwrite processing for the lower area in the first embodiment. For the purpose of explanation, FIG. 12 shows a state where only the lower area EL3 is set in the first image G1. It is assumed here that the images contain only one person. First, as shown in FIG. 12, assuming that the corresponding points at the upper end of the lower areas EL3 and ER3 in the first and second images G1 and G2 are C11 and C12, the y-coordinate of the corresponding point C11 is h−b. Thus, applying formula (1), coordinates of the corresponding point C12 corresponds to:

$$(xR-dR(xR)\times(h-b-h)/b,yR)=(xR+dR(xR),yR)$$

in the first image G1. Thus, the pixel at the upper end of the lower area ER3 in the second image G2 is overwritten with the pixel value of the corresponding point in the first image G1. That is, the pixel C12 in the second image G2 is overwritten with the pixel value of the corresponding point C11.

On the other hand, with respect to a pixel C13 at the lower end of the lower area. ER3 in the second image G2, the y-coordinate of the pixel C13 is h. Thus, applying formula (1), coordinates of the pixel C13 corresponds to:

$$(xR-dR(xR)\times(h-h)/b,yR)=(xR,yR)$$

in the first image G1. This means that the pixel at the lower end of the second image G2 is overwritten with the pixel value of the pixel having the same coordinates in the first image G1. That is, among pixels having the same x-coordinate as the pixel C11 in the first image G1, the pixel value of a pixel C14 at the lower end of the lower area EL3 is overwritten on a pixel C15 in the second image G2, which has the same coordinate value as the pixel C14.

Thus, an area A11 formed by a line of pixels in the y-direction between pixels C11 and C14 in the lower area EL3 of the first image G1 is deformed, as shown in FIG. 12, in a diagonal direction connecting the pixels C12 and C15 in the lower area ER3 of the second image G2, and the thus obtained deformed area A11' is overwritten on an area containing the pixel C12 and the pixels below in the second image G2. It should be noted that, in practice, the positions of the pixels cannot be represented by a number with a decimal point, and therefore an interpolation value obtained from pixels neighboring the corresponding pixel is used for the overwriting.

Carrying out the modification processing in this manner, the lower area ER3 of the second image G2 is deformed, as shown in FIG. 13, such that the disparity between the second image G2 and the first image G1 is gradually decreased from the upper end to the lower end of the lower area ER3. When this modification processing is carried out, if the second image G2 contains an area on the left of the person where the corresponding points cannot be searched out, such as an area A4 in the second image G2, as shown in FIG. 13, the area cannot be overwritten with corresponding pixel values. Therefore, the modification unit 31 extracts an area A5 at a position in the first image G1 corresponding to the area A4, and overwrites the area A4 with the area A5.

On the other hand, if it has been determined that the upper area EL4 contains a portion which is to appear to pop forward from the display surface of the monitor 20 in the stereoscopic view, the modification unit 31 sets a pixel line 51 of pixels lined in the x-direction at the lower end of the upper area EL4 in the first image G1, as shown in FIG. 10, and searches for a point in the second image G2 corresponding to each pixel in the pixel line 51. Then, the modification unit 31 carries out the modification processing to overwrite, according to the disparity between corresponding points, the pixel value of each pixel in the upper area in the second image G2 with the pixel value of the pixel in the first image G1 which is calculated according to formula (2) shown below:

$$(xR - dR(xR) \times (-yR)/b, yR) \qquad (2)$$

Figure 14:
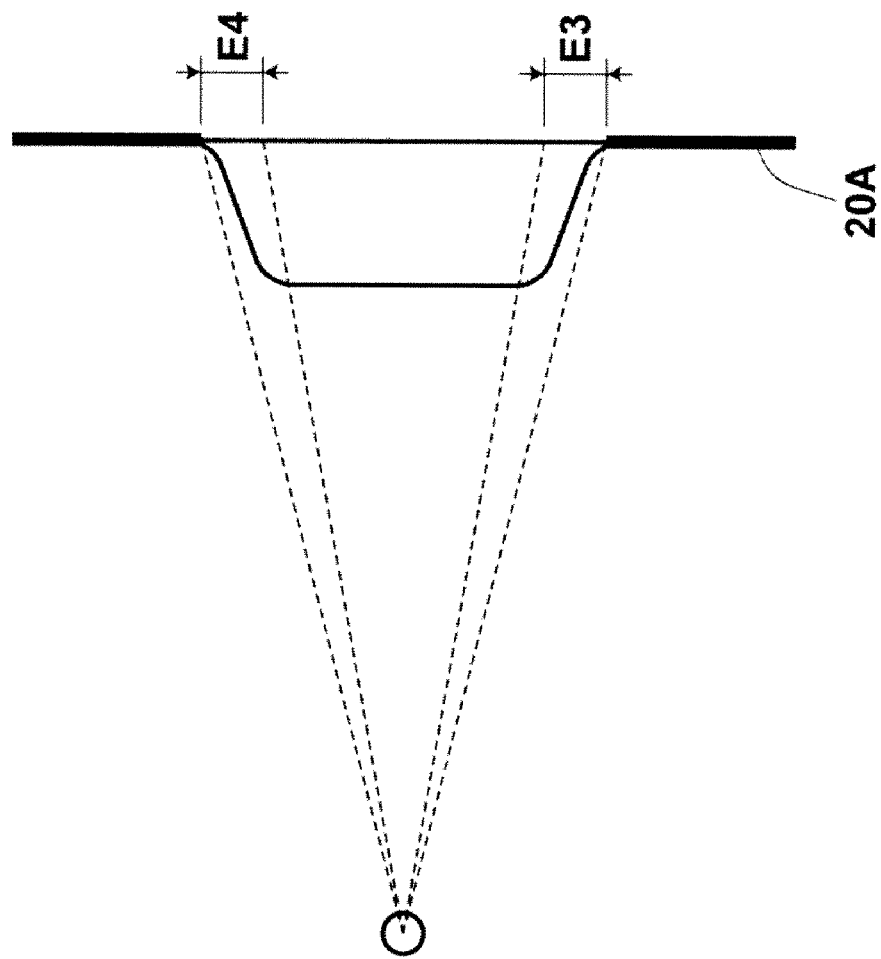
FIG. 14 is a diagram for explaining a result of modification processing in the first embodiment.

By carrying out the modification processing in this manner, the disparity between lower area EL3 in the first image G1 and the area below the corresponding points in the second image G2 corresponding to the pixel line 50 is gradually decreased toward the lower end, such that the disparity is 0 at the lower end. In contrast, the disparity between the upper area EL4 in the first image G1 and the area above the corresponding points in the second image G2 corresponding to the pixel line 51 is gradually decreased toward the upper end, such that the disparity is 0 at the upper end. Thus, when the first and second images G1 and G2 are displayed for three-dimensional viewing, as shown in FIG. 14, the stereoscopic effect at the upper and lower areas of the three-dimensional image is gradually decreased toward the ends of the image. It should be noted that, in FIG. 14, an area E3 in the three-dimensional image corresponds to the lower area EL3 of the end portion area EL, and an area E4 in the three-dimensional image corresponds to the upper area EL4 of the end portion area EL.

The CPU 33 controls the various units of the polynocular camera 1 according to signals inputted via the input unit 34, which includes the release button, etc.

The data bus 35 is connected to the various units forming the polynocular camera 1 and the CPU 33 for communication of various data and information in the polynocular camera 1.

Next, a process carried out in the first embodiment is described. FIG. 15 is a flow chart illustrating the process carried out in the first embodiment. It should be noted that the images displayed for three-dimensional viewing may be live-view images or may be images recorded in the recording media 29.

The CPU 33 monitors whether or not an instruction to display images taken by a photographer or recorded in the recording media 29 has been made (step ST1). If the determination in step ST1 is affirmative, the modification unit 31 sets the end portion area EL in the first image G1 (step ST2). Then, a point corresponding to each pixel in the end portion area EL of the first image G1 is searched out (step ST3), and the disparity between the corresponding points is calculated (step ST4). Then, for each of the four areas, i.e., the right area EL1, the left area EL2, the upper area EL3 and the lower area EL4 of the end portion area EL, determination is made as to whether or not each area contains a portion which is to appear to pop forward from the display surface of the monitor 20 in the stereoscopic view when the first and second images G1 and G2 are displayed for three-dimensional viewing, based on the disparity (step ST5).

If the determination in step ST5 is affirmative, the modification unit 31 applies the modification processing to the area which has the stereoscopic effect to appear to pop forward from the display surface of the monitor 20 in the end portion area of the second image G2, in the manner as described above based on the disparity between the corresponding points (step ST6). Then, the three-dimensional processing unit 30 applies the three-dimensional processing to the first image G1 and modified second image G2 (step ST7). Then, the display control unit 28 displays the thus obtained three-dimensional image for three-dimensional viewing on the monitor 20 (step ST8), and the process ends.

On the other hand, if the determination in step ST5 is negative, this means that the end portions of the three-dimensional image are to appear at a deeper position than the display surface of the monitor 20 in the stereoscopic view when the three-dimensional image is displayed for three-dimensional viewing, and thus the three-dimensional image does not appear unnatural even when the stereoscopic effect at the end portions of the three-dimensional image abruptly vanishes. Therefore, the modification unit 31 does not carry out the modification processing. Then, the three-dimensional processing unit 30 applies the three-dimensional processing to the first and second images G1 and G2 in step ST7, and the process proceeds to step ST8.

As described above, in the first embodiment, if the end portions of the three-dimensional image are to appear to pop forward from the display surface of the monitor 20 in the stereoscopic view when the first and second images G1 and G2 are displayed for three-dimensional viewing, the second image G2 is modified to gradually bring the stereoscopic effect at the end portions closer to the stereoscopic effect which is level with the display surface of the monitor 20, and then the three-dimensional processing is applied to the first image G1 and the modified second image G2. Thus, even when the end portions of the three-dimensional image have the stereoscopic effect to appear to pop forward from the display surface, the stereoscopic effect of the image is gradually decreased toward the ends of the image, as shown in FIGS. 9 and 14. Thus, even when the first and second images G1 and G2 contain an area at the periphery thereof which is not visible in the other of the images, the stereoscopic effect in the area does not abruptly vanish, thereby providing natural appearance at the end portions of the three-dimensional image.

Next, a second embodiment of the invention is described. It should be noted that the polynocular camera of the second embodiment differs from the polynocular camera 1 of the first embodiment only in the processing carried out by the modification unit 31, and therefore detailed description of the configuration is omitted here. While the modification processing is achieved by overwriting the second image G2 with the expanded or deformed area of the end portion area of the first image G1 in the first embodiment, the modification processing in the second embodiment is achieved by overwriting the second image G2 with a deformed or expanding area of the second image G2.

Now, the modification processing according to the second embodiment is described. First, if it is determined that the right area EL1 of the end portion area EL contains the portion which is to appear to pop forward from the display surface of the monitor 20 in the stereoscopic view, the modification unit 31 sets the pixel line 40 in the y-direction at the left end of the right area EL1 in the first image G1 and searches for a point in the second image G2 corresponding to each pixel in the pixel line 40 in the same manner as in the first embodiment. Further, in the second embodiment, the modification unit 31 sets a pixel line 42 of pixels lined in the y-direction at the right end of the right area EL1 of the first image G1 (i.e., at the right end of the first image G1) and searches for a point in the second image G2 corresponding to each pixel in the pixel line 42. Thus, in addition to the corresponding points corresponding to the pixels in the pixel line 40 shown in FIG. 5, corresponding points corresponding to the pixels in the pixel line 42 are searched out, as shown in FIG. 16.

Then, the modification unit 31 carries out the overwrite processing by expanding, in the x-direction, an area formed by a line of pixels between the corresponding points which are lined in the horizontal direction, among the corresponding points in the second image G2 corresponding to the pixel lines 40 and 41 in the first image G1, according to the disparity between the corresponding points, and overwriting the expanded area on the second image G2. FIG. 17 is a diagram for explaining the overwrite processing in the second embodiment. It should be noted that, in FIG. 17, only corresponding points C21 and C22 are indicated by the diagonal hatching, which are to be subjected to the overwrite processing in the second image G2. Assuming that the disparity between the corresponding points with respect to the pixel line 40 for the pixel of interest in the overwrite processing is d1 and the disparity between the corresponding points with respect to the pixel line 42 is d2, then, the modification unit 31 expands, in the horizontal direction, an area 32 formed by pixels between the corresponding points C21 with respect to the pixel line 40 and the corresponding points C22 with respect to the pixel line 42 in the second image G2 by a factor of (a+d1)/(a+d1−d2) to generate an expanded area B2'. It should be noted that a+d1 is a distance from the corresponding point C21 to the end of the second image G2, and (a+d1−d2) is the width of the area 32.

Then, the modification unit 31 overwrites the expanded area B2' on the second image G2 with aligning the left end of the expanded area 32' with the corresponding point C21 in the second image G2. Since the expanded area B2' is generated by expanding the area B2 in the horizontal direction by the factor of (a+d1)/(a+d1−d2), the Wright end of the expand image B2' is positioned on the right end of the second image G2 when the expanded area 32' is overwritten on the second image G2. The modification unit 31 carries out the overwrite processing for all the searched out corresponding points in the second image G2.

By carrying out the modification processing in this manner, the disparity between the area on the right of the corresponding points in the second image G2 corresponding to pixel line 40 and the right area EL1 in the first image G1 is gradually decreased toward the right end, such that the disparity is 0 at the right end. Thus, when the first and second images G1 and G2 are displayed for three-dimensional viewing, as shown in FIG. 9, there is no portion that is visible with only the left eye or the right eye in each image, and in particular, the stereoscopic effect is gradually decreased toward the right end. Further, since the second image G2 is overwritten with the second image G2, the resulting image appears more natural than the image resulting in the first embodiment.

Next, the modification processing in the second embodiment which is carried out when it is determined that the lower area EL3 contains a portion which is to appear to pop forward from the display surface of the monitor 20 in the stereoscopic view is described. First, as shown in FIG. 10, the modification unit 31 sets the pixel line 50 in the x-direction at the upper end of the lower end area EL3 in the first image G1, and searches for a point in the second image G2 corresponding to each pixel in the pixel line 50. Further, in the second embodiment, the modification unit 31 sets a pixel line 52 of pixels lined in the x-direction at the lower end of the lower area EL3 in the first image G1 (i.e., the lower end of the first image G1), as shown in FIG. 18, and searches for a point in the second image G2 corresponding to each pixel in the pixel line 52. Thus, in addition to the corresponding points corresponding to the pixels in the pixel line 50 shown in FIG. 10, the corresponding points corresponding to the pixels of the pixel line 52 are searched out, as shown in FIG. 18.

FIG. 19 is a diagram for explaining the overwrite processing for the lower area in the second embodiment. For the purpose of explanation, FIG. 19 shows a state where only the lower area EL3 is set in the first image G1. It is assumed here that the images contain only one person. First, as shown in FIG. 19, it is assumed that a pixel at the upper end of the lower area EL3 in the first image G1 is C31, a pixel having the same x-coordinate as the pixel C31 at the lower end of the lower area EL3 is C32, and points in the second image G2 corresponding to the pixels C31 and C32 are C33 and C34, respectively.

In the second embodiment, an area A21 formed by a linear pixel line connecting the corresponding points C33 and C34 in the second image G2 is deformed to be shifted in the x-direction according to the disparity between the pixel C32 and the corresponding point C34, and the thus obtained deformed area A22 is overwritten on the second image G2. Assuming here that a pixel in the second image G2 having the same coordinates as the pixel C32 in the first image G1 is C35, the deformed area A22 is an area formed by a linear pixel line connecting the corresponding point C33 and the pixel C35.

FIG. 20 is a diagram for explaining the correspondence relationship between pixels in the deformed area A22 and pixels in the area A21 before being deformed. FIG. 20 shows the lower area EL3 in the first image G1 and the corresponding lower area ER3 in the second image G2. It is assumed here that the coordinates of the corresponding point C33 are (xR1, yR1)=(xR1,h−b), the coordinates of the corresponding point C34 are (xR2,yR2)=(xR2,h), the coordinates of the pixel C35 are (xR3, yR3), and a pixel in the deformed area A22 is (xp,yp). Using the x-coordinate xR2 of the corresponding point C34 and the disparity dR(xR2) between the corresponding point C34 and the pixel C32, the coordinates of the pixel C35 can be expressed as:

$$(xR3, yR3) = (xR2 + dR(xR2), h)$$

Thus, the pixel (xp,yp) in the deformed area A22 corresponds to a pixel in the second image G2 at a position expressed by formula (3) below:

$$(xp − dR(xR2) \times (yp − h + b)/b, yp) \qquad (3)$$

By overwriting the pixel (xp,yp) with the pixel value of the pixel in the second image G2 calculated according to formula (3), the lower area EL3 of the second image G2 is overwritten with the deformed area A22. It should be noted that, in practice, the positions of the pixels cannot be represented by a number with a decimal point, and therefore an interpolation value obtained from pixels neighboring the corresponding pixel is used for the overwriting.

On the other hand, when it is determined that the upper area EL4 contains a portion which is to appear to pop forward from the display surface of the monitor 20 in the stereoscopic view, the modification unit 31 sets the pixel line 51 in the x-direction at the lower end of the upper area EL4 in the first image G1, as shown in FIG. 10, and searches for a point in the second image G2 corresponding to each pixel in the pixel line 51. Further, as shown in FIG. 18, the modification unit 31 sets a pixel line 53 of pixels lined in the y-direction at the upper end of the upper area EL4 in the first image G1, and searches for a point in the second image G2 corresponding to each pixel in the pixel line 53. Then, an area formed by a pixel line in the second image G2 between a point corresponding to each pixel in the pixel line 51 and a point corresponding to each pixel in the pixel line 53 is deformed, and the second image G2 is overwritten with the deformed area.

FIG. 21 is a diagram for explaining the modification processing for the upper area in the second embodiment. FIG. 21 shows an upper area ER4 in the second image G2 corresponding to the upper area EL4 in the first image G1. In the second embodiment, a linear area A31 connecting the corresponding points C43 and C44 in the second image G2 is deformed to be shifted in the x-direction according to the disparity between the corresponding point C44 and the corresponding pixel in the first image G1, and the resulting deformed area A32 is overwritten on the second image G2. It should be noted that the deformed area A32 is an area formed by a linear pixel line between the corresponding point C43 and a pixel C45 which has the same x-coordinate as the pixel in the first image G1 corresponding to the corresponding point C44.

By carrying out the modification processing in this manner, the disparity between the area in the second image G2 below the corresponding points corresponding to the pixel line 50 and the lower area EL3 in the first image G1 is gradually decreased toward the lower end, such that the disparity is 0 at the lower end. Further, the disparity between the area in the second image G2 above the corresponding points corresponding to the pixel line 51 and the upper area EL4 in the first image G1 is gradually decreased toward the upper end, such that the disparity is 0 at the upper end. Therefore, when the first and second images G1 and G2 are displayed for three-dimensional viewing, as shown in FIG. 14, the stereoscopic effect at the upper and lower portions of the three-dimensional image is gradually decreased toward the end portions. In addition, since the second image G2 is overwritten with the second image, the resulting image appears more natural than the image resulting in the first embodiment.

It should be noted that, although the second image G2 is modified in the above-described first and second embodiments, the first image G1 may be modified instead. Alternatively, both the first and second images G1 and G2 may be modified.

Further, although the second image G2 is modified in the above-described first and in the second embodiments such that the disparity at the end portions of the first and second images G1 and G2 is 0, the disparity of 0 may not necessarily be achieved. The second image G2 may be modified such that the disparity at the end portions of the first and second images G1 and G2 provides a stereoscopic effect that is nearly level with the display surface of the monitor 20.

Although the polynocular camera 1 includes the two imaging units 21A and 21B, and the two images G1 and G2 are used to provide the three-dimensional display in the above-described first and second embodiments, the invention is also applicable to a case where the polynocular camera 1 includes three or more imaging units, and three or more images are used to provide three-dimensional display.

Although the three-dimensional display device according to the invention is applied to the polynocular camera 1 in the above-described first and second embodiments, a three-dimensional display device including the three-dimensional processing unit 30, the modification unit 31 and the monitor 20 may separately be provided. In this case, a plurality of images acquired by imaging the same subject from different positions are inputted to the three-dimensional display device, and the three-dimensional processing is carried out after the images have been modified in the same manner as in the above-described embodiments.

Some embodiments of the invention have been described. In addition, the invention may be implemented as a program for causing a computer to function as means corresponding to the three-dimensional processing unit 30 and the modification unit 31 described above to carry out the process as shown in FIG. 15. The invention may also be implemented as a computer-readable recording medium containing such a program.

The invention claimed is:

1. A three-dimensional display device comprising:
   a three-dimensional processing unit for applying three-dimensional processing for three-dimensional display to a plurality of images having a disparity therebetween to generate a three-dimensional image;
   a display unit for carrying out at least three-dimensional display of the three-dimensional image; and
   a modifying unit for modifying, in a case where an end portion of the three-dimensional image appears to pop forward from a display surface of the display unit when the three-dimensional display is carried out, at least one of the images to modify a stereoscopic effect at least a part of the end portion so that at least the part of the end portion appears to be level with the display surface,
   wherein the three-dimensional processing unit applies the three-dimensional processing to the modified images, and
   the modifying unit sets an end portion area of a predetermined range at least a part of a periphery of the images and modifies a disparity between corresponding pixels in the end portion area of the images so that the disparity is gradually decreased toward the end of the images, and modifies at least one of the images by deforming image parts at a left area and a right area of the end portion area of a reference image serving as a reference among the images based on the disparity and modifying the image other than the reference image with the deformed image parts of the end portion area.

2. The three-dimensional display device as claimed in claim 1, wherein the modifying unit modifies the disparity between the corresponding pixels in the end portion area of the images so that the disparity is zero at the end of the images.

3. The three-dimensional display device as claimed in claim 1, wherein the modifying unit modifies at least one of the images by, for each row of pixels along a horizontal direction in the images:
   finding a first corresponding point in the other image corresponding to a first pixel at a leftmost position in the right area of the reference image, and deforming a linear first area comprising a row of pixels along the horizontal direction from the first pixel toward a right end of the reference image based on the disparity so that a length of the first area along the horizontal direction is equal to a length of a linear second area comprising a row of pixels along the horizontal direction from the first corresponding point toward a right end of the other image;
   finding a second corresponding point in the other image corresponding to a second pixel at a rightmost position in the left area of the reference image, and deforming a linear third area comprising a row of pixels along the horizontal direction from the second pixel toward a left end of the reference image based on the disparity so that a length of the third area along the horizontal direction is equal to a length of a linear fourth area comprising a row of pixels along the horizontal direction from the second corresponding point toward a left end of the other image; and
   overwriting the deformed first area on the second area, and the deformed third area on the fourth area.

4. The three-dimensional display device as claimed in claim 1, wherein the modifying unit modifies at least one of the images by, for each row of pixels along a horizontal direction in the images:
- finding a first corresponding point and a second corresponding point in the other image corresponding respectively to a first pixel at a leftmost position and a second pixel at a rightmost position in the right area of the reference image, and deforming a linear first area comprising a row of pixels along the horizontal direction between the first and second corresponding points of the other image based on the disparity so that a length of the first area is equal to a length of a linear second area comprising a row of pixels along the horizontal direction from the first corresponding point toward a right end of the other image;
- finding a third corresponding point and a fourth corresponding point in the other image corresponding respectively to a third pixel at a rightmost position and a fourth pixel at a leftmost position in the left area of the reference image, and deforming a linear third area comprising a row of pixels along the horizontal direction between the third and fourth corresponding points of the other image on the disparity so that a length of the third area based is equal to a length of a linear fourth area comprising a row of pixels along the horizontal direction from the third corresponding point toward a left end of the other image; and
- overwriting the deformed first area on the second area, and the deformed third area on the fourth area.

5. The three-dimensional display device as claimed in claim 1, wherein the unit modifies at least one of the images by deforming image parts at an upper area and a lower area of the end portion area of at least one of the images based on the disparity.

6. The three-dimensional display device as claimed in claim 1, wherein the modifying unit modifies at least one of the images by, for each row of pixels along a vertical direction in the images:
- finding a first corresponding point in the other image corresponding to a first pixel at an uppermost position in the lower area of the reference image, finding a second pixel at a lower end of the reference image in a linear first area comprising a row of pixels along the vertical direction from the first pixel toward the lower end of the reference image, finding a third pixel at a lower end of the other image at an identical position to that of the second pixel of the reference image, and deforming the first area based on the disparity to provide the first area with an identical shape to that of a straight line connecting the first corresponding point and the third pixel;
- finding a second corresponding point in the other image corresponding to a fourth pixel at a lowermost position in the upper area of the reference image, finding a second pixel at an upper end of the reference image in a linear second area comprising a row of pixels along the vertical direction from the fourth pixel toward the upper end of the reference image, finding a fifth pixel at an upper end of the other image at an identical position to that of the fourth pixel of the reference image, and deforming the second area based on the disparity to provide the second area with an identical shape to that of a straight line connecting the second corresponding point and the fifth pixel; and
- overwriting the deformed first area on a lower area of the other image, and the deformed second area on an upper area of the other image.

7. The three-dimensional display device as claimed in claim 1, wherein the modifying unit modifies at least one of the images by, for each row of pixels along a vertical direction in the images:
- finding a first corresponding point in the other image corresponding to a first pixel at an uppermost position in the lower area of the reference image, finding a second pixel at a lower end of the reference image in a linear first area comprising a row of pixels along the vertical direction from the first pixel toward the lower end of the reference image, finding a third pixel at a lower end of the other image at an identical position to that of the second pixel of the reference image, finding a second corresponding point in the other image corresponding to the second pixel, and deforming a linear second area comprising a row of pixels connecting the first corresponding point and the second corresponding point in the other image based on the disparity to provide the second area with an identical shape to that of a straight line connecting the first corresponding point and the third pixel;
- finding a third corresponding point in the other image corresponding to a fourth pixel at a lowermost position in the upper area of the reference image, finding a fifth pixel at an upper end of the reference image in a linear third area comprising a row of pixels along the vertical direction from the fourth pixel toward the upper end of the reference image, finding a sixth pixel at an upper end of the other image at an identical position to that of the fifth pixel of the reference image, finding a fourth corresponding point in the other image corresponding to the fifth pixel, and deforming a linear fourth area comprising a row of pixels connecting the third corresponding point and the fourth corresponding point in the other image based on the disparity to provide the fourth area with an identical shape to that of a straight line connecting the third corresponding point and the sixth pixel; and
- overwriting the deformed second area on a lower area of the other image, and the deformed fourth area on an upper area of the other image.

8. A three-dimensional display method for use with a three-dimensional display device including a three-dimensional processing unit for applying three-dimensional processing for three-dimensional display to a plurality of images having a disparity therebetween to generate a three-dimensional image, and a display unit for carrying out at least three-dimensional display of the three-dimensional image, the method comprising:
- setting an end portion area of a predetermined range at least a part of a periphery of the images to modify, in a case where an end portion of the three-dimensional image appears to pop forward from a display surface of the display unit when the three-dimensional display is carried out, at least one of the images to modify a stereoscopic effect at least a part of the end portion so that at least the part of the end portion appears to be level with the display surface;
- modifying a disparity between corresponding pixels in the end portion area of the images so that the disparity is gradually decreased toward the end of the images, and deforming image parts at a left area and a right area of the end portion area of a reference image serving as a reference among the images based on the disparity;
- modifying at least one of the images by modifying the image other than the reference image with the deformed image parts of the end portion area; and
- applying the three-dimensional processing to the modified images.

9. A non-transitory computer-readable recording medium containing a program for causing a computer to carry out a three-dimensional display method for use with a three-dimensional display device including a three-dimensional processing unit for applying three-dimensional processing for three-dimensional display to a plurality of images having a disparity therebetween to generate a three-dimensional image, and a display unit for carrying out at least three-dimensional display of the three-dimensional image, the program comprising the procedure of:

setting an end portion area of a predetermined range at least a part of a periphery of the images to modify, in a case where an end portion of the three-dimensional image appears to pop forward from a display surface of the display unit when the three-dimensional display is carried out, at least one of the images to modify a stereoscopic effect at least a part of the end portion so that at least the part of the end portion appears to be level with the display surface;

modifying a disparity between corresponding pixels in the end portion area of the images so that the disparity is gradually decreased toward the end of the images, and deforming image parts at a left area and a right area of the end portion area of a reference image serving as a reference among the images based on the disparity;

modifying at least one of the images by modifying the image other than the reference image with the deformed image parts of the end portion area; and applying the three-dimensional processing to the modified images.

10. A three-dimensional processing device comprising:

a three-dimensional processing unit for applying three-dimensional processing for three-dimensional display to a plurality of images having a disparity therebetween to generate a three-dimensional image; and a modifying unit for modifying, in a case where an end portion of the three-dimensional image appears to pop forward from a display surface of a display unit when the three-dimensional display is carried out, at least one of the images to modify a stereoscopic effect at least a part of the end portion so that at least the part of the end portion appears to be level with the display surface, wherein the three-dimensional processing unit applies the three-dimensional processing to the modified images, and the modifying unit sets an end portion area of a predetermined range at least a part of a periphery of the images and modifies a disparity between corresponding pixels in the end portion area of the images so that the disparity is gradually decreased toward the end of the images, and modifies at least one of the images by deforming image parts at a left area and a right area of the end portion area of a reference image serving as a reference among the images based on the disparity and modifying the image other than the reference image with the deformed image parts of the end portion area.

11. A three-dimensional processing method of applying three-dimensional processing for three-dimensional display to a plurality of images having a disparity therebetween to generate a three-dimensional image, the method comprising:

setting an end portion area of a predetermined range at least a part of a periphery of the images to modify, in a case where an end portion of the three-dimensional image appears to pop forward from a display surface of a display unit when the three-dimensional display is carried out, at least one of the images to modify a stereoscopic effect at least a part of the end portion so that at least the part of the end portion appears to be level with the display surface;

modifying a disparity between corresponding pixels in the end portion area of the images so that the disparity is gradually decreased toward the end of the images, and deforming image parts at a left area and a right area of the end portion area of a reference image serving as a reference among the images based on the disparity;

modifying at least one of the images by modifying the image other than the reference image with the deformed image parts of the end portion area; and applying the three-dimensional processing to the modified images.

12. A non-transitory computer-readable recording medium containing a program for causing a computer to carry out a three-dimensional processing method of applying three-dimensional processing for three-dimensional display to a plurality of images having a disparity therebetween to generate a three-dimensional image, the program comprising the procedure of:

setting an end portion area of a predetermined range at least a part of a periphery of the images to modify, in a case where an end portion of the three-dimensional image appears to pop forward from a display surface of a display unit when the three-dimensional display is carried out, at least one of the images to modify a stereoscopic effect at least a part of the end portion so that at least the part of the end portion appears to be level with the display surface;

modifying a disparity between corresponding pixels in the end portion area of the images so that the disparity is gradually decreased toward the end of the images, and deforming image parts at a left area and a right area of the end portion area of a reference image serving as a reference among the images based on the disparity;

modifying at least one of the images by modifying the image other than the reference image with the deformed image parts of the end portion area; and applying the three-dimensional processing to the modified images.

* * * * *